(12) United States Patent
Levine et al.

(10) Patent No.: US 9,279,331 B2
(45) Date of Patent: Mar. 8, 2016

(54) GAS TURBINE ENGINE AIRFOIL WITH DIRT PURGE FEATURE AND CORE FOR MAKING SAME

(75) Inventors: Jeffrey R. Levine, Vernon Rockville, CT (US); Jeffrey S. Beattie, South Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1134 days.

(21) Appl. No.: 13/453,137

(22) Filed: Apr. 23, 2012

(65) Prior Publication Data

US 2013/0280080 A1    Oct. 24, 2013

(51) Int. Cl.
*F01D 5/18* (2006.01)

(52) U.S. Cl.
CPC .............. *F01D 5/188* (2013.01); *F01D 5/187* (2013.01); *F05D 2260/607* (2013.01); *Y02E 10/721* (2013.01)

(58) Field of Classification Search
CPC .......... F01D 5/18; F01D 5/187; F01D 5/188; Y02E 10/721
See application file for complete search history.

(56) References Cited

U.S. PATENT DOCUMENTS

| | | | |
|---|---|---|---|
| 5,599,166 A * | 2/1997 | Deptowicz et al. | 416/97 R |
| 6,234,754 B1 | 5/2001 | Zelesky et al. | |
| 6,915,840 B2 | 7/2005 | Devine, II et al. | |
| 6,932,571 B2 | 8/2005 | Cunha et al. | |
| 7,270,173 B2 | 9/2007 | Wiedemer et al. | |
| 7,665,965 B1 * | 2/2010 | Liang | 416/1 |
| 8,096,768 B1 * | 1/2012 | Liang | 416/97 R |
| 2005/0265840 A1 * | 12/2005 | Levine et al. | 416/97 R |
| 2005/0265842 A1 * | 12/2005 | Mongillo et al. | 416/97 R |
| 2005/0265844 A1 * | 12/2005 | Levine et al. | 416/97 R |
| 2006/0239819 A1 | 10/2006 | Albert et al. | |
| 2007/0140848 A1 * | 6/2007 | Charbonneau et al. | 416/96 R |
| 2007/0147997 A1 * | 6/2007 | Cunha et al. | 416/97 R |
| 2008/0131285 A1 * | 6/2008 | Albert et al. | 416/96 R |
| 2008/0169412 A1 | 7/2008 | Snyder et al. | |

FOREIGN PATENT DOCUMENTS

JP           11311102        11/1999

OTHER PUBLICATIONS

International Preliminary Report on Patentability for PCT Application No. PCT/US2013/030332 mailed Nov. 6, 2014.

* cited by examiner

*Primary Examiner* — Edward Look
*Assistant Examiner* — Aaron R Eastman
(74) *Attorney, Agent, or Firm* — Carlson, Gaskey & Olds, P.C.

(57) ABSTRACT

An airfoil includes a body. The body includes leading and trailing edges adjoining pressure and suction sides to provide an exterior airfoil surface. First and second cooling passages extend in a radial direction from a root to a tip. The first cooling passage includes a tip flag passage that is radially inboard from the tip and extends in a chord-wise direction to a first end that penetrates the trailing edge. The second cooling passage includes a second end terminates adjacent the tip flag passage and a dirt purge passage interconnects the second end to the tip flag passage. A core for making the airfoil is also disclosed.

18 Claims, 4 Drawing Sheets

GAS TURBINE ENGINE AIRFOIL WITH DIRT PURGE FEATURE AND CORE FOR MAKING SAME

BACKGROUND

This disclosure relates to an airfoil for a gas turbine engine. More particularly, the disclosure relates to a core and corresponding airfoil that provides adequate dirt purge.

Airfoils for gas turbine engines typically include rather complex internal cooling passages receiving cooling fluid from a cooling source. The passages are provided by core structures constructed from ceramic and/or refractory metal cores, which provide correspondingly shaped cooling passages within the airfoil.

One type of cooling passage includes a trailing edge cooling passage extending in a chord-wise direction from a radially extending cooling passage. The trailing edge cooling passage exits the trailing edge and can be relatively narrow. Depending upon the size of the trailing edge cooling passage, which may be as little as 0.008 inch (0.20 mm), dirt may become lodged in the trailing edge cooling passage thereby adversely impacting cooling of the airfoil.

SUMMARY

In one exemplary embodiment, an airfoil includes a body. The body includes leading and trailing edges adjoining pressure and suction sides to provide an exterior airfoil surface. First and second cooling passages extend in a radial direction from a root to a tip. The first cooling passage includes a tip flag passage that is radially inboard from the tip and extends in a chord-wise direction to a first end that penetrates the trailing edge. The second cooling passage includes a second end terminates adjacent the tip flag passage and a dirt purge passage interconnects the second end to the tip flag passage.

In a further embodiment of any of the above, a trailing edge passage extends from the second cooling passage that penetrates the trailing edge.

In a further embodiment of any of the above, pedestals are arranged in the trailing edge passage and interconnect opposing pressure and suction side walls.

In a further embodiment of any of the above, the trailing edge passage has a thickness in the range of 0.008 to 0.0.020 inch (0.20 to 0.51 mm).

In a further embodiment of any of the above, the dirt purge passage includes a width in the range of 0.017 to 0.045 inch (0.43 to 1.14 mm).

In a further embodiment of any of the above, a third cooling passage is arranged between the first and second cooling passages in the chord-wise direction. The third cooling passage has a serpentine shape and terminates in a third end near the tip flag passage. A tie passage interconnects the third end to the tip flag passage.

In a further embodiment of any of the above, the tip flag passage is discrete from the trailing edge passage.

In one exemplary embodiment, a core for an airfoil includes first and second core portions that extend in a radial direction. The first core portion includes a tip flag portion extending in a chord-wise direction and has a first end configured to penetrate an airfoil trailing edge. The second core portion includes a second end terminating adjacent the tip flag portion. A core tie interconnects the second end to the tip flag portion and is configured to provide a dirt purge passage.

In a further embodiment of any of the above, a trailing edge core portion extends from the second core portion and is configured to penetrate the airfoil trailing edge.

In a further embodiment of any of the above, multiple core portions are secured to one another and configured to correspond to multiple cooling passages. The first and second core portions are provided by a first core. The trailing edge core portion is provided by a second core secured to the first core.

In a further embodiment of any of the above, the first core is ceramic, and the second core is refractory metal core.

In a further embodiment of any of the above, the second core portion includes a slot receiving the trailing edge core portion.

In a further embodiment of any of the above, the trailing edge core portion includes multiple apertures that are configured to provide airfoil pedestals.

In a further embodiment of any of the above, the trailing edge core portion has a thickness in the range of 0.008 to 0.020 inch (0.20 to 0.51 mm).

In a further embodiment of any of the above, the core tie includes a width in the range of 0.017 to 0.045 inch (0.43 to 1.14 mm).

In a further embodiment of any of the above, a third core portion is arranged between the first and second core portions in the chord-wise direction. The third core portion has a serpentine shape and terminates in a third end near the tip flag portion. A second core tie interconnects the third end to the tip flag portion.

In a further embodiment of any of the above, an inlet core portion is arranged opposite the tip flag portion and interconnects the first, second and third core portions to one another.

In a further embodiment of any of the above, the core includes the core tie. The second core portion and the tip flag portion are integral with one another and constructed of the same material.

BRIEF DESCRIPTION OF THE DRAWINGS

The disclosure can be further understood by reference to the following detailed description when considered in connection with the accompanying drawings wherein.

DETAILED DESCRIPTION

Figure 1:
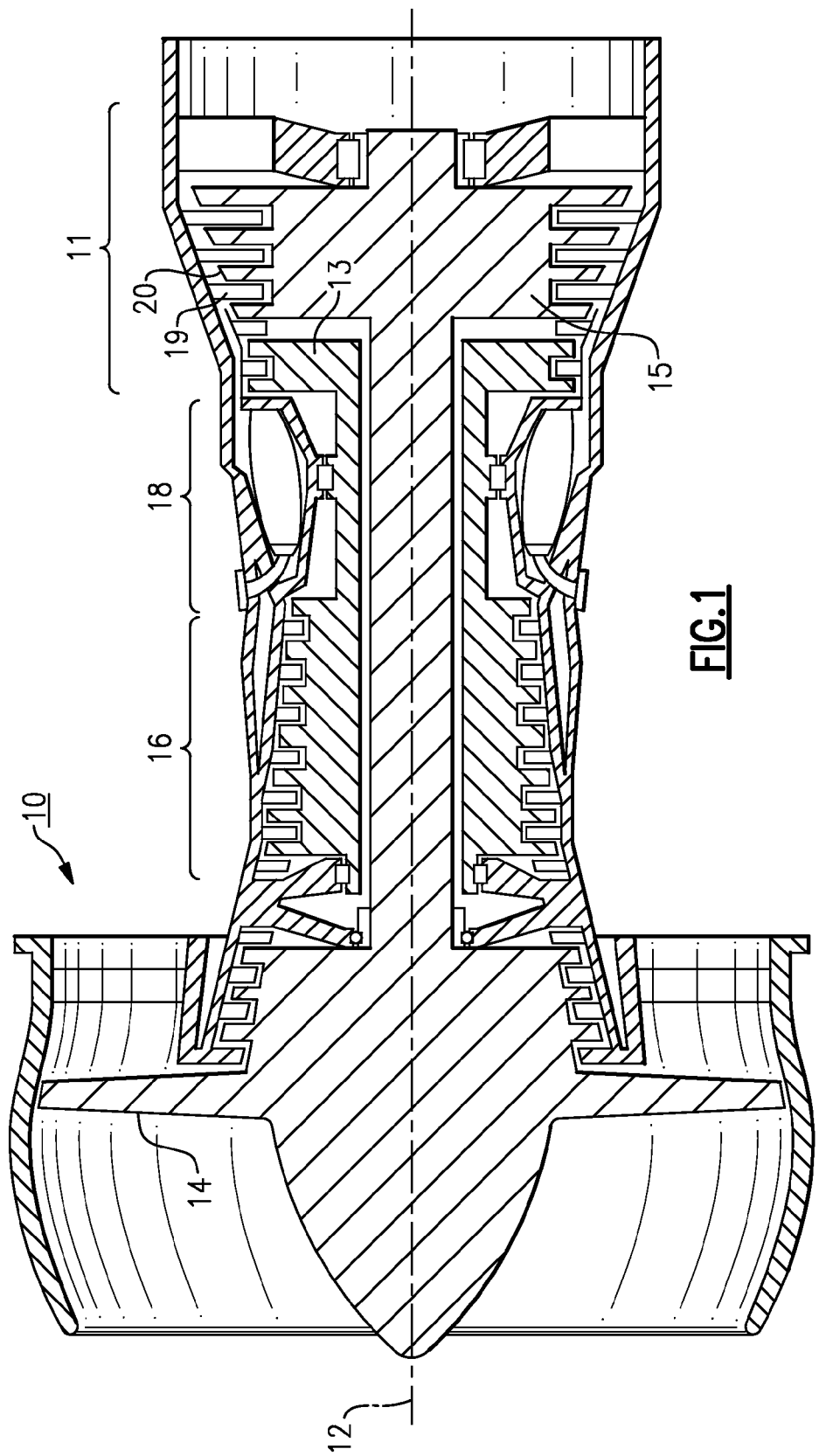
FIG. 1 is a schematic view of an example gas turbine engine incorporating the disclosed airfoil.

FIG. 1 schematically illustrates a gas turbine engine 10 that includes a fan 14, a compressor section 16, a combustion section 18 and a turbine section 11, which are disposed about a central axis 12. As known in the art, air compressed in the compressor section 16 is mixed with fuel that is burned in combustion section 18 and expanded in the turbine section 11. The turbine section 11 includes, for example, rotors 13 and 15 that, in response to expansion of the burned fuel, rotate, which drives the compressor section 16 and fan 14.

The turbine section 11 includes alternating rows of blades 20 and static airfoils or vanes 19. It should be understood that FIG. 1 is for illustrative purposes only and is in no way intended as a limitation on this disclosure or its application.

Figure 2A:
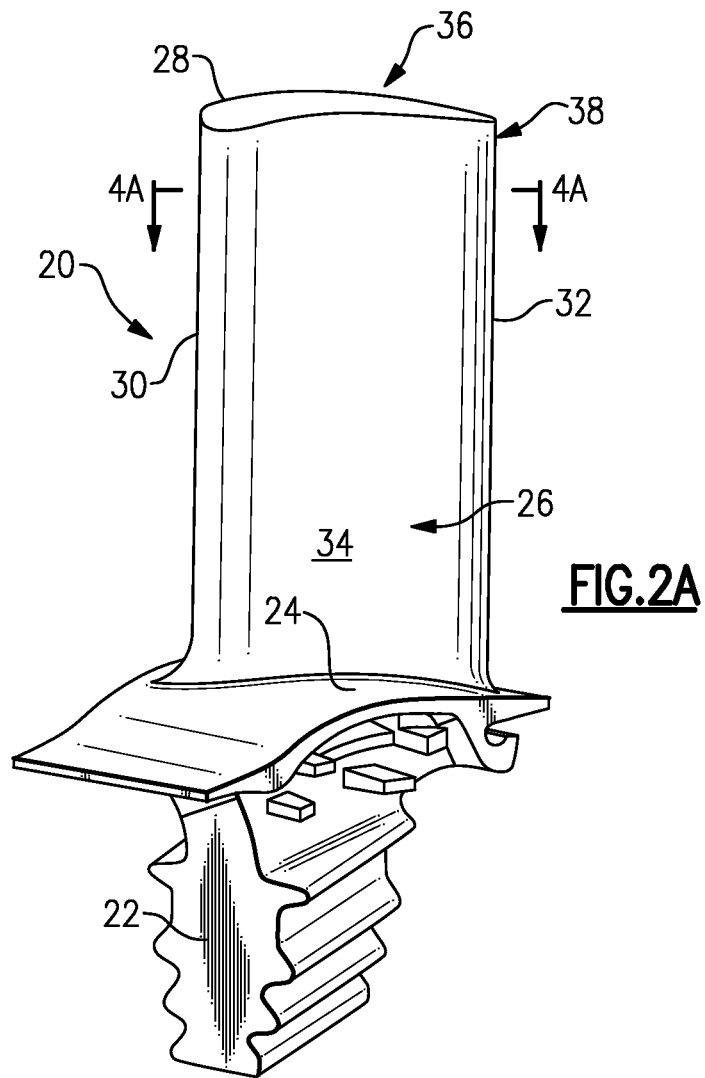
FIG. 2A is a perspective view of the airfoil having the disclosed cooling passage.

An example blade 20 is shown in FIG. 2A. The blade 20 includes a platform 24 supported by a root 22, which is secured to a rotor, for example. An airfoil 26 extends radially outwardly from the platform 24 opposite the root 22 to a tip 28. While the airfoil 26 is disclosed as being part of a turbine blade 20, it should be understood that the disclosed airfoil can also be used as a vane.

Figure 2B:
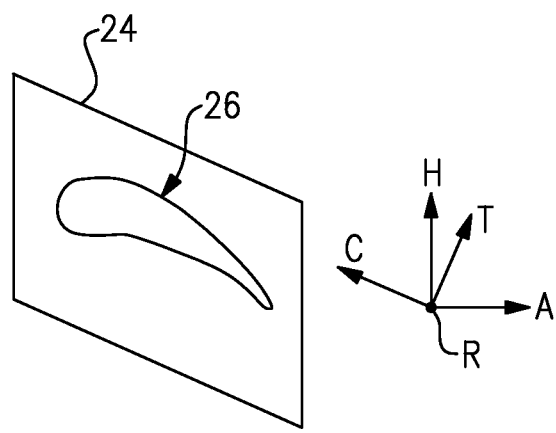
FIG. 2B is an end view of the airfoil illustrating directional references.

Referring to FIG. 2B, the airfoil 26 includes an exterior airfoil surface 38 extending in a chord-wise direction C from a leading edge 30 to a trailing edge 32. The airfoil 26 is provided between pressure and suction sides 34, 36 in an airfoil thickness direction T, which is generally perpendicular to the chord-wise direction C. Multiple airfoils 26 are arranged circumferentially in a circumferential direction H. The airfoil 26 extends from the platform 24 in a radial direction R to the tip 28. The exterior airfoil surface 38 may include multiple film cooling holes.

Figure 3A:
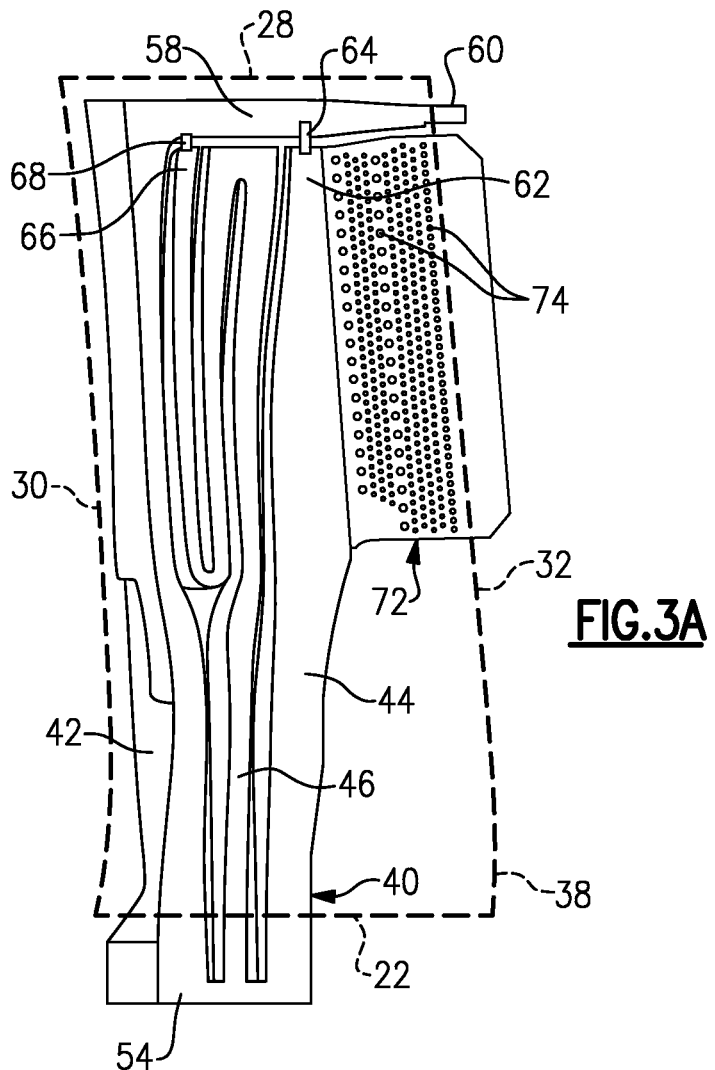
FIG. 3A is a perspective view of an example core providing a core tie corresponding to a dirt purge passage, with an exterior airfoil surface shown in phantom.

An example core for making the airfoil 26 is illustrated in FIG. 3A. The core may be a single, unitary core or include multiple core portions secured to one another. The shapes of the core portions correspond to shapes of internal cooling passages of the airfoil 26. In the example shown, the core is provided by a first core 40 constructed from ceramic and a second core 72 constructed from a refractory metal.

The first core 40 includes first, second and third core portions 42, 44, 46, which all extend generally in the radial direction. An inlet core portion 54 interconnects the first, second and third core portions 42, 44, 46 at the root 22. In the example, the first core portion 42 is located near the leading edge 30 of the airfoil 26. The first core portion 42 extends in the chord-wise direction to provide a tip flag portion 58 adjacent to the tip 28. The tip flag portion 58 terminates in a first end 60 that is configured to extend beyond the trailing edge 32 of the airfoil 26 for casting purposes, which will be discussed in more detail relative to FIG. 3B.

With continuing reference to FIG. 3A, the second core portion 44 terminates in a second end 62 adjacent to and radially beneath the tip flag portion 58. A first core tie 64 interconnects the second end 62 to the tip flag portion 58. The first core tie 64 provides stability of the second end 62 relative to the tip flag portion 58 as well as provides a corresponding dirt purge feature (or passage) for the airfoil 26.

In the example, the first and second core portions 42, 44 provide a single radial run. The third core portion 46 is arranged between the first and second core portions 42, 44 in the chord-wise direction. The third core portion 46 has a serpentine shape providing multiple radial runs and terminates in a third end 66 near the tip flag portion 58. A second core tie 68 interconnects the third end 66 to the tip flag portion 58.

Figure 3B:
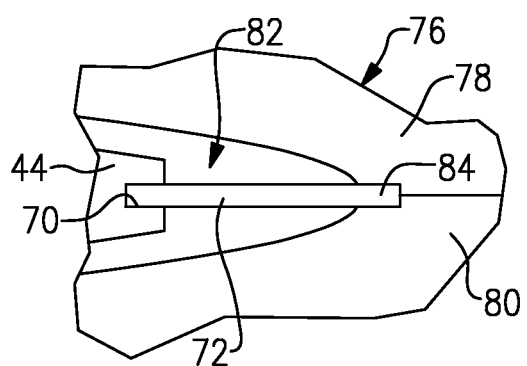
FIG. 3B is a partial cross-sectional view of the core shown in a wax mold.

Referring to FIGS. 3A and 3B, the second core portion 44 includes a slot 70 for receiving the second core portion 72. The second core portion 72 includes multiple apertures 74, which provide correspondingly shaped pedestals 88, discussed below relative to FIGS. 4A and 4B. The second core portion 72 is designed to extend beyond the exterior airfoil surface 38 (FIG. 3A) such that the second core portion 72 provides a core edge 84 that is received and held between first and second mold portions 78, 80 of a mold 76. The first and second mold portions 78, 80 provide a mold cavity 82 that receives wax that provides a shape of the airfoil 26.

Figure 4A:
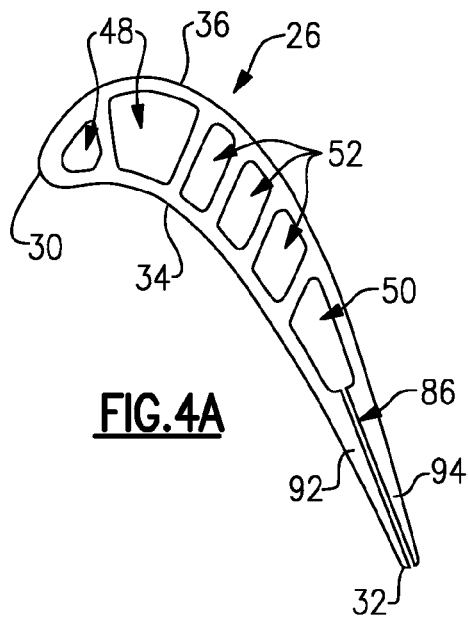
FIG. 4A is a cross-sectional view through the airfoil taken along line 4A-4A in FIG. 2A.
Figure 4B:
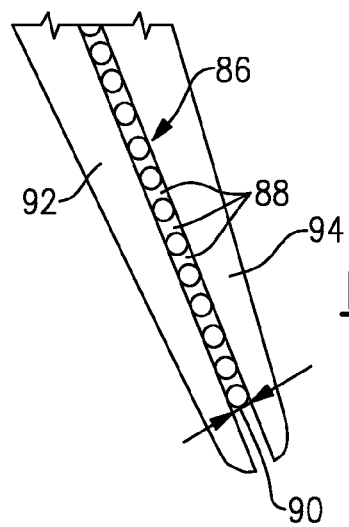
FIG. 4B is an enlarged view of a portion of the airfoil illustrated in FIG. 4A.
Figure 5:
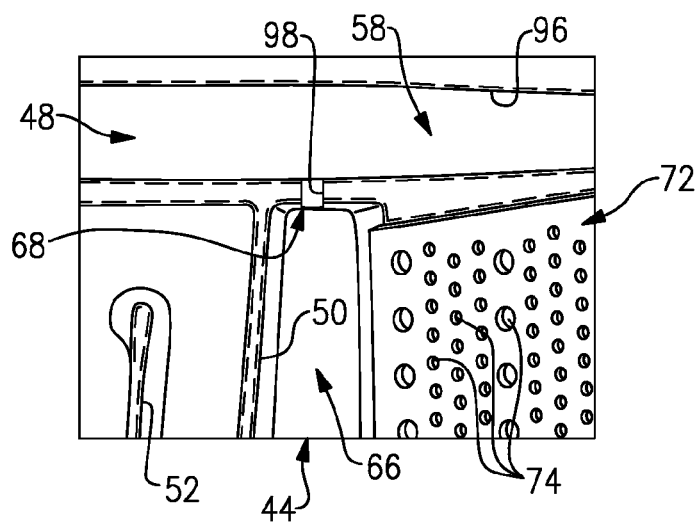
FIG. 5 is an enlarged view of the upper portion of the core illustrated in FIG. 3A with the corresponding airfoil cooling passages shown in phantom.

Referring to FIGS. 4A and 4B and FIG. 5, the airfoil 26 includes first, second and third cooling passages 48, 50, 52 that respectively correspond to the shape of the first, second and third core portions 42, 44, 46. A trailing edge cooling passage 86 is provided in the airfoil 26 that corresponds to the shape of the second core portion 72. As shown in FIG. 4B, the apertures 74 provided in the second core portion 72 produce pedestals 88 that interconnect pressure and suction side walls 92, 94 providing desired cooling characteristics along the trailing edge 32 of the airfoil 26. The trailing edge cooling passage 86 has a thickness 90 in the range of 0.008 to 0.020 inch (0.20 to 0.51 mm).

Referring to FIG. 5, the second core portion 44 terminates in the third end 66, as previously described, to provide the second cooling passage 50. Typically, the dirt accumulating in the second cooling passage 50 would be forced to exit the trailing edge cooling passage 86, which is relatively narrow and obstructed by pedestals 88 (FIG. 4B). With the second core tie 68 interconnecting the second core portion 44 and the tip flag portion 58, a dirt purge feature or passage 98 is provided, which permits the dirt in the second cooling passage 50 to instead exit through the tip flag passage 96 rather than the trailing edge cooling passage 86. As such, the tip flag passage 96 is otherwise discrete from the trailing edge cooling passage 86.

Although example embodiments have been disclosed, a worker of ordinary skill in this art would recognize that certain modifications would come within the scope of the claims. For that reason, the following claims should be studied to determine their true scope and content.

What is claimed is:

1. An airfoil comprising:
    a body including leading and trailing edges adjoining pressure and suction sides to provide an exterior airfoil surface, first and second cooling passages extending in a radial direction from a root to a tip, the first cooling passage including a tip flag passage radially inboard from the tip and extending in a chord-wise direction to a first end that penetrates the trailing edge, the second cooling passage including a second end terminating adjacent the tip flag passage, and a dirt purge passage interconnecting the second end to the tip flag passage.

2. The airfoil according to claim 1, comprising a trailing edge passage extending from the second cooling passage that penetrates the trailing edge.

3. The airfoil according to claim 2, comprising pedestals arranged in the trailing edge passage and interconnecting opposing pressure and suction side walls.

4. The airfoil according to claim 2, wherein the trailing edge passage has a thickness in the range of 0.008 to 0.020 inch (0.20 to 0.51 mm).

5. The airfoil according to claim 2, wherein the tip flag passage is discrete from the trailing edge passage.

6. The airfoil according to claim 1, wherein the dirt purge passage includes a width in the range of 0.017 to 0.045 inch (0.43 to 1.14 mm).

7. The airfoil according to claim 1, comprising a third cooling passage arranged between the first and second cooling passages in the chord-wise direction, the third cooling passage having a serpentine shape and terminating in a third end near the tip flag passage, and a tie passage interconnecting the third end to the tip flag passage.

8. A core for an airfoil comprising:
    first and second core portions extending in a radial direction, the first core portion including a tip flag portion extending in a chord-wise direction and having a first end configured to penetrate an airfoil trailing edge, the second core portion including a second end terminating adjacent the tip flag portion; and a core tie interconnecting the second end to the tip flag portion and configured to provide a dirt purge passage.

9. The core according to claim 8, comprising a trailing edge core portion extending from the second core portion and configured to penetrate the airfoil trailing edge.

10. The core according to claim 9, comprising multiple core portions secured to one another and configured to correspond to multiple cooling passages, the first and second core portions provided by a first core, and the trailing edge core portion provided by a second core secured to the first core.

11. The core according to claim 10, wherein the first core is ceramic, and the second core is refractory metal core.

12. The core according to claim 11, wherein the second core portion includes a slot receiving the trailing edge core portion.

13. The core according to claim 9, wherein the trailing edge core portion includes multiple apertures configured to provide airfoil pedestals.

14. The core according to claim 13, wherein the trailing edge core portion has a thickness in the range of 0.008 to 0.020 inch (0.20 to 0.51 mm).

15. The core according to claim 8, wherein the core tie includes a width in the range of 0.017 to 0.045 inch (0.43 to 1.14 mm).

16. The core according to claim 8, comprising a third core portion arranged between the first and second core portions in the chord-wise direction, the third core portion having a serpentine shape and terminating in a third end near the tip flag portion, and a second core tie interconnecting the third end to the tip flag portion.

17. The core according to claim 16, comprising an inlet core portion arranged opposite the tip flag portion and interconnecting the first, second and third core portions to one another.

18. The core according to claim 8, wherein the core tie, the second core portion and the tip flag portion are integral with one another and constructed of the same material.

* * * * *